United States Patent [19]

Linhardt

[11] Patent Number: 4,469,497
[45] Date of Patent: Sep. 4, 1984

[54] AXISYMMETRICAL SEPARATOR FOR SEPARATING PARTICULATE MATTER FROM A FLUID CARRYING MEDIUM

[75] Inventor: Hans D. Linhardt, Newport Beach, Calif.

[73] Assignee: Linhardt & Associates, Inc., Newport Beach, Calif.

[21] Appl. No.: 345,731

[22] Filed: Feb. 4, 1982

[51] Int. Cl.³ .............................................. B01D 45/12
[52] U.S. Cl. ...................... 55/282; 55/343; 55/347; 55/392; 55/458; 55/461; 55/DIG. 14; 210/512.1; 210/512.2
[58] Field of Search ................... 55/17, 261, 263, 277, 55/282, 343, 347, 391, 392, 458, 461, DIG. 14, 394, 397, 431; 210/512.1, 512.2; 209/143, 145

[56] References Cited

U.S. PATENT DOCUMENTS

| | | | |
|---|---|---|---|
| 1,735,298 | 11/1929 | Pfeffer | 55/343 |
| 2,468,607 | 4/1949 | Schneible | 55/398 |
| 2,696,911 | 12/1954 | Umney | 55/461 |
| 3,710,561 | 1/1973 | Garrone | 55/429 |
| 3,853,528 | 12/1974 | Wodrich et al. | 55/17 |
| 3,972,696 | 8/1976 | Angelillo | 55/222 |
| 4,221,655 | 9/1980 | Nakayama et al. | 55/261 |
| 4,251,243 | 2/1981 | Salete-Garces | 55/261 |
| 4,285,705 | 8/1981 | Niemann | 55/277 |
| 4,292,050 | 9/1981 | Linhardt et al. | 55/1 |
| 4,301,002 | 11/1981 | Loo | 209/143 |

FOREIGN PATENT DOCUMENTS

| | | | |
|---|---|---|---|
| 352654 | 4/1930 | Fed. Rep. of Germany | 55/397 |
| 2805958 | 8/1979 | Fed. Rep. of Germany | 55/17 |
| 570578 | 7/1945 | United Kingdom | 55/394 |
| 794834 | 5/1958 | United Kingdom | 55/17 |
| 683785 | 9/1979 | U.S.S.R. | 55/392 |
| 721708 | 3/1980 | U.S.S.R. | 55/277 |
| 725687 | 4/1980 | U.S.S.R. | 55/277 |

OTHER PUBLICATIONS

Linhardt, Hans D., Beveridge, John H. and Boone, Charles G., "Investigation of High Velocity Wedge Separator for Particle Removal in Coal Gasification Plants," Technical Progress Report No. 1100-8 submitted to U.S. Department of Energy, Division of Coal Conversion and Utilization, Jul. 15, 1981.

Elliott, D. G., "Investigation of a Gas-Driven Jet Pump for Rocket Engines," JPL Technical Release No. 34-32, Reproduced by Armed Services Technical Information Agency, Arlington 12, Virginia, Sep. 20, 1960.

Airco Cryogenics, "High Velocity Wedge Separator," Part I, Contract Proposal to Energy Research and Development Administration Division of Procurement—Procurement Operations, Aug. 5, 1977.

W. Berkhahn et al., Influence of Flow-Field Structure on Uranium Isotope Separation in the Separation Nozzle, Nuclear Technology, vol. 40, No. 3, Oct. 1978, pp. 329-340.

Primary Examiner—David L. Lacey
Attorney, Agent, or Firm—Jackson, Jones & Price

[57] ABSTRACT

A separator for separating particles carried in a fluid carrying medium is disclosed. The separator includes an elongated duct and associated openings incorporated in a solid body. The duct is axisymmetrical relative to its longitudinal axis, and includes a curved wall portion having a curved cross-section taken along the longitudinal axis. An axisymmetrical opening located downstream of the curved wall portion leads from the duct into an axisymmetrical channel which is substantially radially disposed relative to the longitudinal axis. Continuation of the duct downstream of the opening is a discharge portion which is substantially colinear with the longitudinal axis. In operation, a substantial majority of the fluid carrying medium leaves the duct radially through the opening and channel in a state substantially free of particles. A remaining small portion of the fluid carrying medium and a substantial majority of the particles are channelled into the discharge portion by centrifugal forces arising due to travel of the particles along the curved walls. For industrial scale separation of particles from a fluid carrying medium, such as for the clean-up of stack gases, an array of several hundred to several thousand of the separators is provided.

29 Claims, 21 Drawing Figures

AXISYMMETRICAL SEPARATOR FOR SEPARATING PARTICULATE MATTER FROM A FLUID CARRYING MEDIUM

BACKGROUND OF THE INVENTION

1. Field of the Invention

The present invention is directed to a separator for separating particulate matter from a fluid carrying medium. More particularly, the present invention is directed to a particulate matter carrying gas separator which is of an axisymmetrical configuration relative to the flow of the carrying gas in the separator.

2. Brief Description of the Prior Art

Devices for separating particulate matter carried in a gas have been known in the prior art for a long time. The particulate separators of the prior art include filters and electrostatic precipitators. A third category of prior art particulate separators work on the principle that when a carrying gas stream including particulate matter is forced to travel in a curved duct, the particles are affected to a larger extent by a resulting centrifugal force than the carrying gas. Consequently, the path of travel of the particles in the curved duct is different than that of the carrying gas, and therefore the particles may be captured and collected by appropriately positioned collecting slots or devices.

Several particle separators of different construction, but employing the above-noted principle, have been devised in the prior art and are widely used in the chemical and related industries and for purifying stack-gases and the like prior to their release into the environment. The prior art particle separators of the above-noted type are often referred to in the industry as "cyclone separators." Examples of cyclone separators may be found in U.S. Pat. Nos. 3,972,696; 3,710,561; 2,696,911; 2,468,607 and in British Patent Specification No. 570,578 and in German Pat. Nos,. 352,654 and 543,466.

A principal disadvantage of cyclone separators is their large size and their general inability to collect smaller than approximately 10 micron sized particles. However, as is well appreciated by those skilled in the art, present-day practice in the chemical and related industries and in the energy-producing field often requires removal of substantially all particulate matter from a carrying gas, including removal of particles in the 2-10 micron range.

In order to remove particulate matter smaller than 10 microns, the prior art principally utilizes electrostatic precipitators. Electrostatic precipitators, however, have a relatively high cost of initial construction, and while operating, require a relatively high input of energy.

As an alternative to electrostatic precipitators and in order to separate particles substantially in the 1-10 micron range, a particulate separator was devised which utilizes a shock wave created in a supersonic flow of a carrier gas to separate the particulate matter. This "supersonic velocity" separator is described in a report written by Hans D. Linhardt titled "Investigation of High Velocity Wedge Separator for Particle Removal in Coal Gasification Plants" and submitted to the U.S. Department of Energy under contract EF-77-C-01,2709.

U.S. Pat. No. 4,292,050 assigned to the same assignee as the present application for patent, discloses a particulate separator adapted for separating particles as small as approximately 1.0 micron by a combination of a curved duct and a shock zone in a supersonic gas flow. The patent also discloses the utilization of a curved duct in a fast, but less than supersonic flow (approximately 0.2-1.0 Mach) for collecting particles in the 1-10 micron range, and the utilizatition of a condensation phenomenon in a supersonic flow for capturing particles smaller than approximately 1.0 microns.

Although the high velocity separator disclosed in the above-noted report submitted to the U.S. Department of Energy, and in U.S. Pat. No. 4,292,050, function well, there is still a need in the prior art for an efficient separator adapted for removing approximately 2-10 micron sized particles from a carrying gas. This need exists particularly in light of the fact that a particulate separator operating with supersonic, or close to supersonic gas flow velocity may require higher than desirable energy input and fabrication of relatively delicate equipment.

A feature of the particle separator described in U.S. Pat. No. 4,292,050 is that the separator utilizes an elongated duct, which is curved in its elongate direction in order to impart a centrifugal force to the carrying gas and the therein contained particulate matter. Other embodiments of the separator disclosed in U.S. Pat. No. 4,292,050 as well as the separators described in the above-noted report submitted to the U.S. Department of Energy, comprise substantially straight elongated ducts containing a supersonic gas flow.

A common feature of all of the above discussed particular separators is that the separators are not axisymmetrical relative to the direction of the carrier gas flow, although a Technical Proposal to the Energy Research and Development Administration, U.S. Department of Energy, dated Aug. 5, 1977 mentions the possibility of constructing an axisymmetrical particulate separator which would utilize a cone rather than a wedge in a supersonic gas flow. An axisymmetrical separator employing a conical obstruction in the flow of gaseous potassium carrying liquid droplets of lithium metal is also suggested by D. G. Elliot in Technical Release No. 34-32 of the Jet Propulsion Laboratory, Sept. 20, 1960. In spite of the foregoing, the present inventors are unaware of any actual or suggested prior art particle separator which is axisymmetrical relative to the direction of the gas flow, and which utilizes a centrifugal force created by a wall of a duct for the separation of the particles.

SUMMARY OF THE INVENTION

It is an object of the present invention to provide a separator which is adapted for separating particles in the 2-10 micron range from a carrying gas.

It is another object of the present invention to provide a separator adapted for efficiently separating particles from a carrying gas which is relatively compact and inexpensive to manufacture and operate.

These and other objects and advantages are attained by a separator element wherein a gas flow passes through a duct having a substantially straight longitudinal axis with the duct being axisymmetrical relative to the longitudinal axis. The duct includes an inlet nozzle and a curved wall portion downstream of the inlet nozzle. The curved wall portion is not only axisymmetrical relative the longitudinal axis but has a curved cross-section in the direction of the longitudinal axis of the duct. An opening is formed in the duct adjacent to and downstream of the curved wall portion, and an outlet portion which is substantially colinear with the longitudinal axis is formed downstream of the opening. The opening and the outlet portion are also axisymmetric relative to the longitudinal axis.

The effect of the above summarized novel structure is, that a substantial majority of particles carried in the carrying gas which is forced to flow in the duct, are centered by centrifugal force in an area surrounding the longitudinal axis of the duct, and are discharged through the outlet portion together with a relatively small portion of the carrier gas. A substantial majority of the carrier gas, in a state substantially free of particulate matter leaves the duct radially through the axisymmetrical opening. In a system adapted for purifying a carrying gas on an industrial scale, an array of a multitude of the separator elements is utilized.

The features of the present invention can be best understood, together with further objects and advantages, by reference to the following description, taken in connection with the accompanying drawings wherein like numerals indicate like parts.

DESCRIPTION OF THE PREFERRED EMBODIMENTS

The following specification taken in conjunction with the drawings sets forth the preferred embodiment of the present invention in such a manner that any person skilled in the particulate separator manufacturing arts can use the invention. The embodiments of the invention disclosed herein are the best modes contemplated by the inventor for carrying out his invention, although it should be understood that various modifications can be accomplished within the parameters of the present invention.

Figure 3:
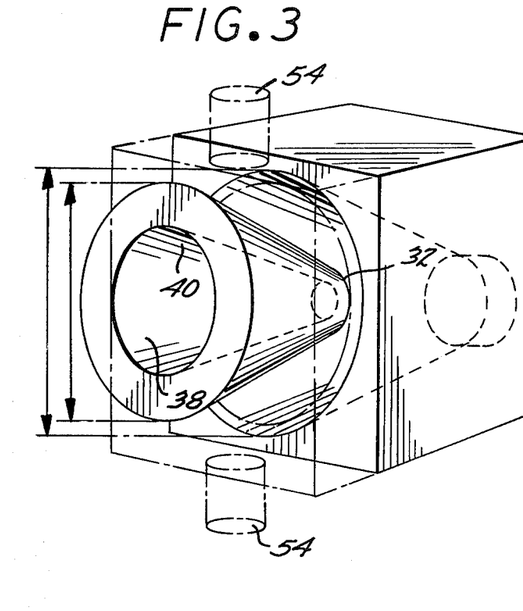
FIG. 3 is a highly schematic perspective view showing the principle of construction of the particulate separator of the present invention.
Figure 4:
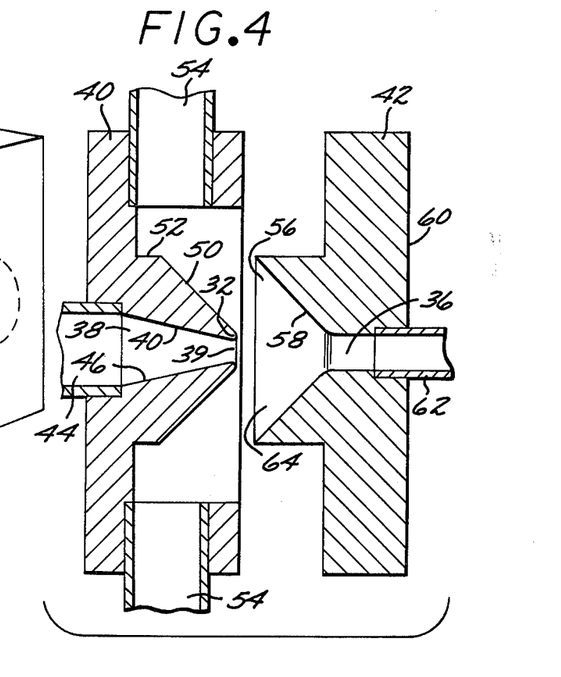
FIG. 4 is another schematic cross-sectional view showing the principle of construction of the particulate separator of the present invention.
Figure 6:
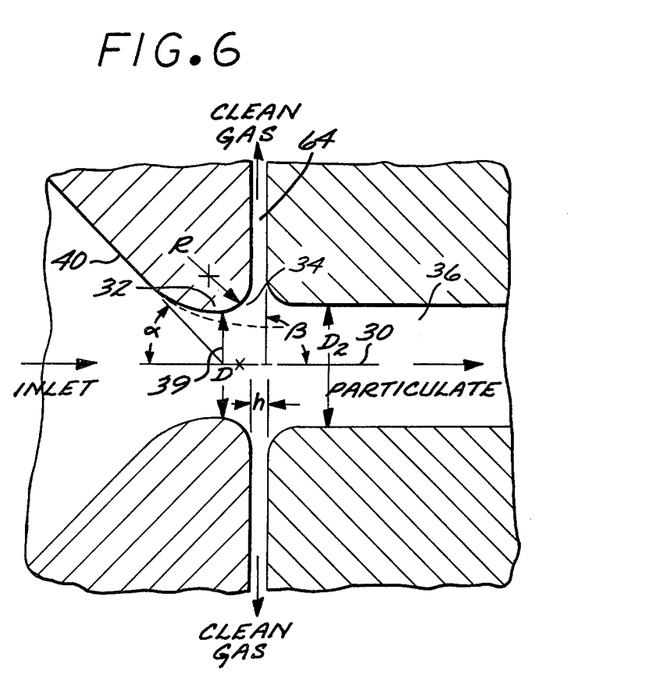
FIG. 6 is a schematic cross-sectional view showing several important design parameters of the particulate separator of the present invention.

Referring now to the drawing Figures, and particularly to the schematic views of FIGS. 3, 4 and 6, the theoretical basis of operation and the principle of construction of the novel particulate separator of the present invention is disclosed.

As is known by those skilled in the arts relating to fluid flow mechanics, the behavior of a relatively small particle carried in a flowing fluid medium is dependent on the momentum range of the particle relative to the fluid. The momentum range $\Lambda$ is defined in Equation I, as $$\Lambda \simeq 8/3 \frac{\rho_s}{\rho} \frac{\sigma}{C_D} \qquad \text{EQUATION I}$$

wherein $\rho_s$ is the density of the particle, $\rho$ is the density of the fluid medium, $\sigma$ is the radius of the particle, and $C_D$ is the drag coefficient. As is further known by those familiar with the science of fluid flow mechanics, the drag coefficient ($C_D$) is related to the particle Reynold's number in such a manner that in a high velocity flow the drag coefficient value is small.

In accordance with the present invention, a duct 28 is provided wherethrough a fluid medium containing particulate matter is forced to flow. The flow may be caused by a fan (not shown) which creates an appropriate pressure drop within the separator, or in any other manner compatible with the process wherein the invention is utilized. As principal characteristic features of the present invention, the duct 28 is axisymmetrical relative to its longitudinal axis 30, and includes an axisymmetrical curved wall portion 32, and an axisymmetrical radial opening 34 substantially adjacent to and downstream of the curved wall portion 32. Still further downstream of the radial opening 34, the duct 28 continues as a discharge duct 36 which is still axisymmetrical relative to the longitudinal axis 30.

As an additional feature, the duct 28 includes a gradually converging axisymmetrical inlet portion or inlet nozzle 38 upstream of the curved wall portion 32. As is readily apparent from an inspection of FIG. 6 for example, an incoming gas flow gradually accelerates in the inlet nozzle 38. Conventional means are provided upstream of the inlet duct 38 to assure uniform, steady flow with a smooth velocity profile. The particles reach equilibrium with the flow prior to reaching the curved wall portion 32.

A prominent feature of the operation of the particulate separator of the present invention is that a predominant majority of the particles carried in the fluid carrying medium are channeled into the discharge duct 36 and travel in the discharge duct 36 substantially along the longitudinal axis 30 of the duct 28, even though only a small portion of the fluid carrying medium travels through the discharge duct 36. The small portion of the fluid carrying medium wherein the particulate matter is concentrated is hereinafter termed the "bleed flow." A predominant majority of the fluid carrying medium leaves the duct 28 through the radial opening 34 in a state which is substantially free of contaminating particulate matter. In contrast, the bleed flow travels through the discharge duct 36 along the longitudinal axis 30.

In order to accomplish the above-noted result and function, certain dimensions of the particulate separator of the present invention must be selected properly in light of the expected properties of the fluid carrying medium and of the particulate matter which is dispersed therein. In this regard, it is noted that the particulate separator of the present invention is primarily adapted and designed for separating solid particles from a gas flow. However, certain embodiments of the particulate separator of the present invention may also be adapted to remove liquid particles, such as liquid droplets, from a gas flow. Still further, it is possible to design, within the scope of the present invention, a particulate separator which removes solid particles from a liquid flow, or liquid particles from a liquid flow. The latter situation may arise when finely dispersed droplets of a first denser liquid must be separated from a carrying liquid of lesser density which is immiscible with the first liquid. Hereinafter, for the sake of simplicity, the fluid carrying medium is referred to as the "carrying gas."

The schematic view of FIG. 6 shows the important design parameters of the particulate separator of the present invention. The design parameters together with the physical characteristics of the carrying gas and of the particles dispersed therein, determine the operational capabilities of the separator. These design parameters are: the inlet angle ($\alpha$) of the inlet portion or nozzle 38 relative to the longitudinal axis 30; the radius (R) of curvature of the curved wall portion 32; the diameter (D*) of the throat area 39, i.e., the shortest diameter of the duct 28 in the curved wall portion; the diameter ($D_2$) of the discharge or outlet duct 36; the angle ($\beta$) of the axis of the radial opening 34 relative to the longitudinal axis 30 as measured from the downstream side of the axis as shown; and the width (h) of the radial opening 34.

The inlet angle ($\alpha$) and the angle ($\beta$) of the axis of the radial opening 34 relative to the longitudinal axis 30, together define the turning angle ($\theta$) of the clean gas, in accordance with Equation II.

$$\alpha + \beta = \theta \qquad \text{EQUATION II}$$

The angle ($\beta$) of the axis of the radial opening 34 relative to the longitudinal axis 30 is also referred to as the "clean gas discharge angle."

The cross-sectional area of the throat 39 (A*), the cross-sectional area ($A_2$) of the discharge duct 36, and the area ($A_h$) of the radial opening 34 are further important design parameters, which however can be calculated from the above-noted basic design parameters on the basis of well known geometrical relationships.

Figure 9:
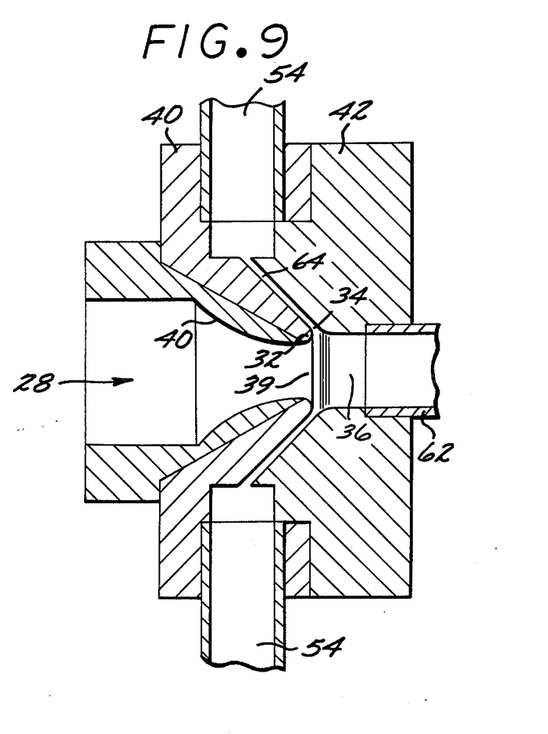
FIG. 9 is a cross-sectional view showing a fourth actual preferred embodiment of the particulate separator of the present invention.

It should be further noted that the radius (R) of curvature of the curved wall portion (32) may represent a simplified, effective radius of curvature, since the curvature may be a compound curvature having several component radii. Such a curved wall portion 32 of compound curvature is shown, for example, on the cross-sectional view of FIG. 9 which depicts an actual preferred embodiment of the particle separator of the present invention.

A further very important design parameter of the particle separator of the present invention is the velocity of the gas flow in the throat area 39. This velocity is preferably expressed in terms of Mach numbers, and is, generally speaking, approximately in the 0.04 to 1.0 Mach range within the scope of the present invention.

Referring still to FIG. 6, the trajectory of a particle which travels in the gas flow immediately adjacent to the wall 40 of the inlet duct 38 is shown.

In accordance with the present invention, the parameters of the separator, and particularly the areas of the discharge duct 36 and of the radial opening 34, $A_2$ and $A_h$ respectively, are chosen in such a manner that a substantial majority of the gas flow is discharged through the radial opening 34, and only a small portion of the overall gas flow (the bleed flow) is discharged through the discharge duct 36. Thus, the gas flow undergoes a substantial turn, which is characterized by the hereinabove defined turning angle $\theta$. However, as the gas flow turns, a centrifugal force arises and acts on the carrying gas and on the particles. Since the particles, due to their large individual mass density, are affected to a much greater extent by the centrifugal force than the carrying gas, the particles undergo trajectories, such as the one shown on FIG. 6, which channel the particles in the direction of the bleed flow. In other words, the particles, or more strictly speaking, particles having larger than a preselected radius, are incapable of "taking the same turn" as the gas flow, and therefore are separated from the main gas flow.

In accordance with the foregoing, it is an important feature of the present invention that the width (h) of the radial opening 34 is selected in such a manner that all particles having a larger than a predetermined radius have a trajectory which totally misses the radial opening 34 and are, therefore, collected theoretically with 100% efficiency.

It was found, in accordance with the present invention, that for a predetermined constant gas flow velocity and predetermined constant bleed flow, the collection efficiency ($\eta$) of particles of a given radius ($\sigma$) depends upon the displacement $\Delta x$ of the trajectory of the particle $\sigma$ from the curved wall 32 in a direction normal to the tangent of the curved wall 32, as is shown on FIG. 6. The relationship between $\Delta x$, the curvature R, and the turning angle $\theta$ is defined by Equation III.

$$\Delta x = (R \cdot \Lambda)^{\frac{1}{2}} \cdot \theta \qquad \text{EQUATION III}$$

In order to ensure that the trajectory of a particle of a given size (or larger) will not enter the radial opening 34 having a width of h, the condition of Equation IV must be satisfied.

$$\Delta x/h > 1 \qquad \text{EQUATION IV}$$

This assures high mass collection efficiency and assures that the particles of the given minimum size, or larger particles, will be collected with a theoretical 100% efficiency. Such a particle is called a design particle.

For design purposes $\Delta x | h$ is related to the above-noted geometrical parameters as shown in Equation V.

$$\frac{\Delta x}{h} = 4 \left( \frac{R}{D^*} \cdot \frac{\Lambda}{D^*} \right)^{\frac{1}{2}} \cdot \theta \frac{D_2}{D^*} \cdot \frac{A^*}{A_h} \qquad \text{EQUATION V}$$

As was discussed above in connection with Equation I, the momentum range $\Lambda$ incorporates the density of the gas, the density of the particles, and the radius of the particles. Therefore, Equations III, IV and V (discussed above) are useful for establishing the critical design parameters of the separator.

For the effective design of the separator it is important to initially establish the lower limit of the radius of the particle which is desired to be separated from the carrying gas with a theoretical 100% efficiency. As stated above, such a particle is then considered the design particle.

Due to practical considerations, 2 microns were chosen as the design particle radius for the hereinafter-shown actual embodiments of the particle separator of the present invention. Thus, in the design of the hereinafter-disclosed specific embodiments of the separator of the present invention, the value $2\mu$ represents $\sigma$.

It is further noted that the momentum range ($\Lambda$) in Equation I indirectly accounts for the temperature and pressure of the carrying gas. This is because the density of the gas is dependent on its temperature and pressure. The hereinafter disclosed actual dimensions of the several embodiments of the particle separator of the present invention were principally designed for use in association with the carrying gas of a typical chemical process having a temperature of approximately 1600° F., a pressure of 250 p.s.i.a., a gas flow rate through each separator unit of approximately 0.2 lbs./second, and having a 3% by weight loading with particulate matter.

Having disclosed the theoretical basis of operation, and the important design parameters of the particle separator of the present invention, reference is made to FIGS. 1–5, wherein the preferred principle of construction of the axisymmetrical particle separator of the present invention is disclosed. The particle separator of the present invention is preferably formed as a complex duct 28 or channel in a solid body having associated openings. Still preferred for the purposes of practical manufacture is to construct each separator element of the present invention in two solid bodies 40 and 42 which are fabricated to be complementary to one another. The two solid bodies 40 and 42, when fixedly attached to one another by suitable fasteners such as nuts and bolts (not shown), incorporate the complex duct 28 and associated openings and together form the particle separator of the present invention. This is best shown on FIGS. 3, 4 and 5.

More particularly, and with principal reference to FIG. 4, a first solid body 40 includes a circular opening 44 which leads into the inlet portion or nozzle 38. Walls 46 of the inlet portion are tapered to form a conical nozzle 38. Adjacent to the conical nozzle 38, the inner walls 46 of the first solid body 40 are curved in the hereinafter described manner to form the curved wall portion 32. As is best shown in FIGS. 1, and 3–5, the duct of the separator actually terminates in the first solid body 40 at the curved wall portion 32, although in the assembled separator element the curved walls 32 comprise only an intermediate portion of the duct 28.

Figure 1:
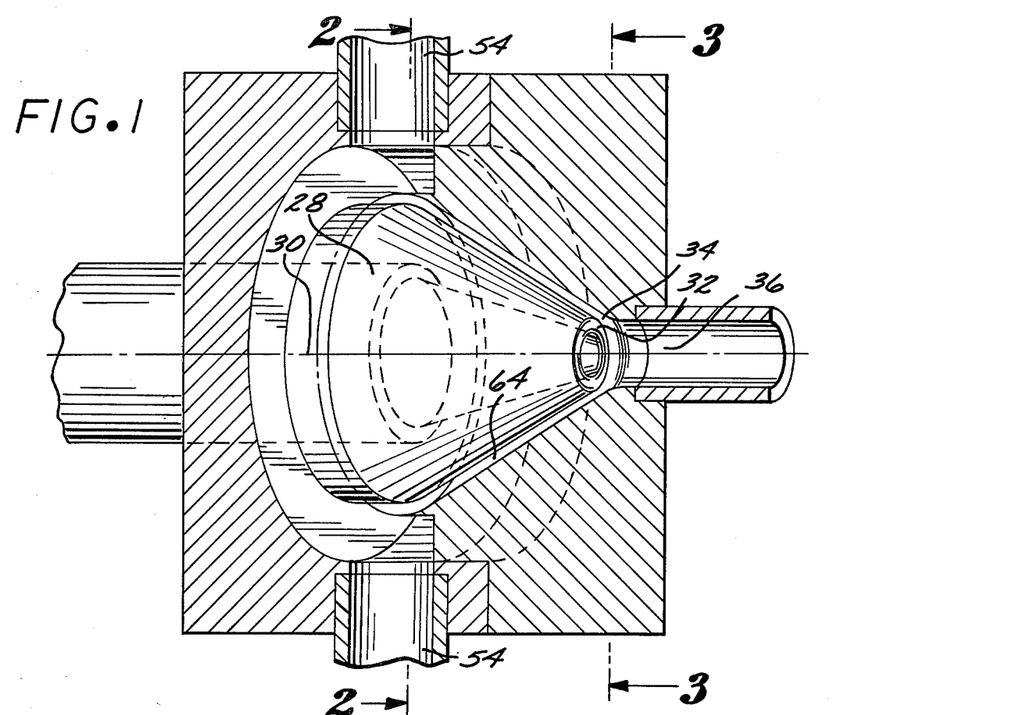
FIG. 1 is a schematic perspective, partially broken away view of a particulate separator of the present invention.
Figure 2:
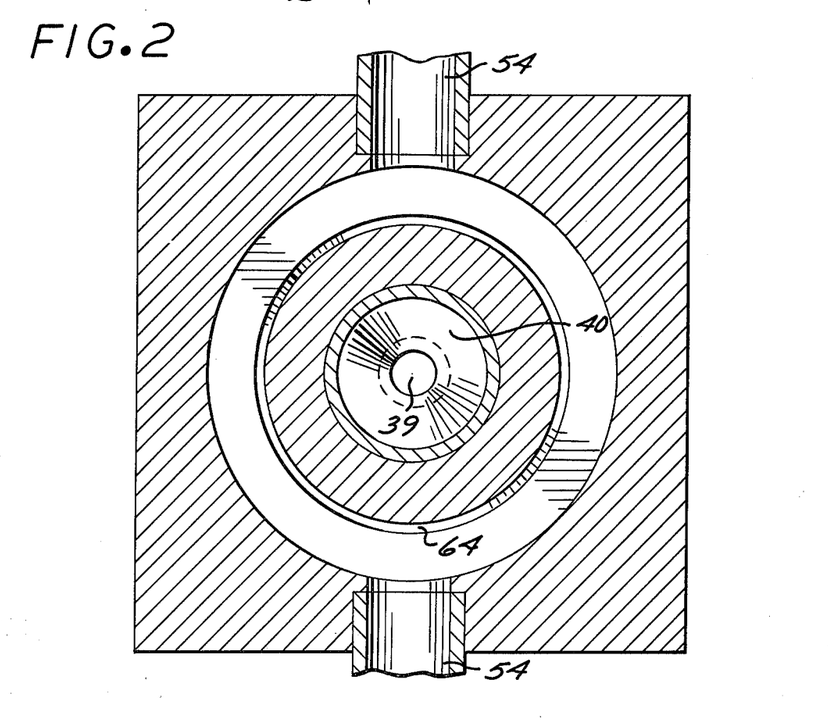
FIG. 2 is a schematic cross-sectional view taken on lines 2,2 of FIG. 1.
Figure 5:
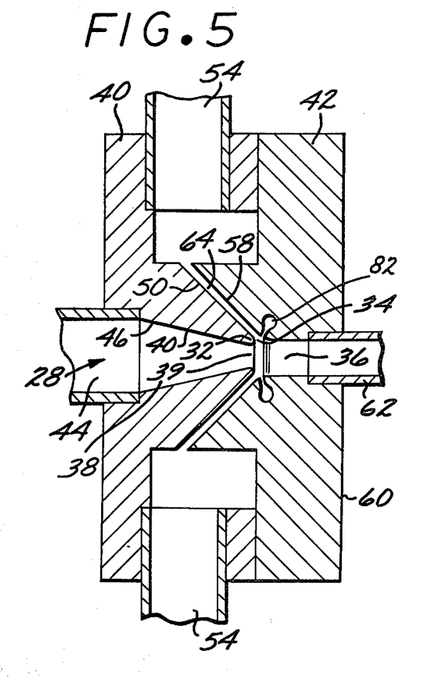
FIG. 5 is a cross-sectional view of a first actual preferred embodiment of the particulate separator of the present invention.

Still having principal reference to FIGS. 1, 4 and 5, the first solid body 40 is shown to have a conically-shaped outer wall 50 which terminates in a shoulder 52. A plurality of apertures 54 are also formed in the first solid body 40.

The second solid body 42 has an opening 56 which includes conically tapering inner walls 58. Adjacent to the conically tapering inner walls 58, the opening 56 continues in the second solid body 42 as a substantially straight discharge duct 36 of substantially circular cross-section. It emerges from a rear surface 60 of the second solid body 42. In order to further transport the collected particulate matter together with the bleed flow, a suitable tube 62 is attached to the discharge duct 36.

As is best shown in FIGS. 1 and 5, when the first and second solid bodies 40 and 42 are juxtaposed and fastened to one another, the conically-shaped outer wall 50 of the first solid body 40 and the conically-shaped inner walls 58 of the second solid body 42 together define the axisymmetrical radial opening 34 in the duct 28, and also define an axisymmetrical channel 64 for the radially flowing substantially particle-free gas. Furthermore, the axisymmetrical channel 64 for the substantially particle-free gas is in fluid communication with the apertures 54 in the first solid body wherethrough the "clean" gas is collected.

Referring now particularly to Table I and FIGS. 5, 7, 8, 9, and 15 actual embodiments and important dimensions of

TABLE I

| Configuration | $\theta°$ | R inches | $D^x$ inches | $D_2$ inches | $\eta$ glass beads | h inches | $R/D^*$ | $D_2/D^*$ |
|---|---|---|---|---|---|---|---|---|
| A (not shown in FIGS.) | 135° | 0.25 | 0.875 | 0.95 | 92 | 0.165 | 0.2857 | 1.085 |
| B (FIG. 8) | 130° | 0.180 | 0.658 | 1.00 | 96 | 0.087 | 0.274 | 1.520 |

TABLE I-continued

| Configuration | θ° | R inches | D$^x$ inches | D$_2$ inches | η glass beads | h inches | R/D* | D$_2$/D* |
|---|---|---|---|---|---|---|---|---|
| C (FIG. 5) | 150° | 0.06 | 0.377 | 0.50 | 99 | 0.06 | 0.159 | 1.326 |
| D (FIG. 7) | 165° | 0.125 | 0.744 | 1.025 | 99 | 0.078 | 0.168 | 1.378 |
| E (FIG. 9) | 165° | 0.125 | 0.744 | 1.025 | 99 | 0.10 | 0.168 | 1.378 |
| F (FIG. 15) | 164.5° | 0.04 | 0.255 | 0.330 | 99 | 0.032 | 0.16 | 1.29 | the particulate separator of the present invention are disclosed. For the sake of clarity, each configuration indicated in Table I is assigned a reference capital letter, and the corresponding drawing Figure in the present application for patent is indicated adjacent to the reference letter. The columns of the Table indicate the actual parameters of the respective embodiment, such as the turning angle (θ); the effective radius of curvature (R) of the curved wall portion 32; the throat diameter (D$^x$); the diameter (D$_2$) of the discharge duct 36; the ratios of R/D$^x$ and D$_2$/D$^x$, and the width (h) of the radial opening 34. In addition, the experimentally obtained efficiency of the respective specific embodiment in the collection of glass beads in a flow of air, is indicated for each specific embodiment. The turning angle θ as well as the angles α and β are illustrated on FIG. 7.

In the experiments reflected in Table I, the gas flow velocity in the throat 39 was approximately M 0.20, and the bleed flow was approximately 5% of the total gas flow. The glass beads used in the experiments were of substantially spherical configuration and had a radius range of approximately 1μ to 20μ.

As Table I and the drawing Figures indicate, although the actual configuration and design parameters of the several specific embodiments of the particulate separator of the present invention are rather widely varied, the overall mass collection efficiency (η) of all specific embodiments shown here is very good. The number indicated in Table I as mass collection efficiency (η) represents the percentage of total mass of particles carried in the bleed flow versus the total mass of particles entering the separator unit.

An inspection of FIGS. 5, 7, 8, 9 and 15 also reveals that the clean gas discharge angle (β) may vary quite widely in accordance with the present invention. More particularly for separation of solid matter from a carrying gas β varies approximately in the range of 25° to 145°. However, the clean gas discharge angle (β) is preferably an acute angle as viewed in the direction of the gas flow or as measured from the upstream side of the axis. Consequently, as viewed from a direction opposite to the gas flow, (as measured from the downstream side of the axis) or as β is indicated in FIG. 6, the numerical value of β is preferably larger than 90°.

Generally speaking, when the particulate separator of the present invention is designed to separate with a theoretically 100% efficiency, particles of a radius larger than 2 microns from a carrying gas, the above-noted dimensions of the separator are in the following range: R is approximately between 0.04 to 0.20 inches, θ is approximately between 40°-180°, D$_2$/D$^x$ is approximately between 1.085 to 1.52, D$^x$ is approximately between 0.15-0.75 inches, D$_2$ is approximately between 0.30 to 1.025 inches, and h is approximately between 0.03 to 0.165 inches.

It should be emphasized, however, that the above-noted range of dimensions are disclosed specifically for a particle separator built in accordance with the present invention for capturing particles larger than 2μ radius from the carrying gases commonly occuring in most chemical and energy producing applications, such as stack gases. A particle separator designed in accordance with the present invention for capturing particles of a significantly smaller radius (e.g., 0.3μ radius) from a carrying gas, has dimension which are, by-and-large, outside of the above-given exemplary ranges. Furthermore, as it was indicated above, the density of the particles, and of the carrying gas, and therefore the pressure and temperature of the same, also effects the dimensions of the separator in accordance with the herein-before described relationships.

Figure 7:
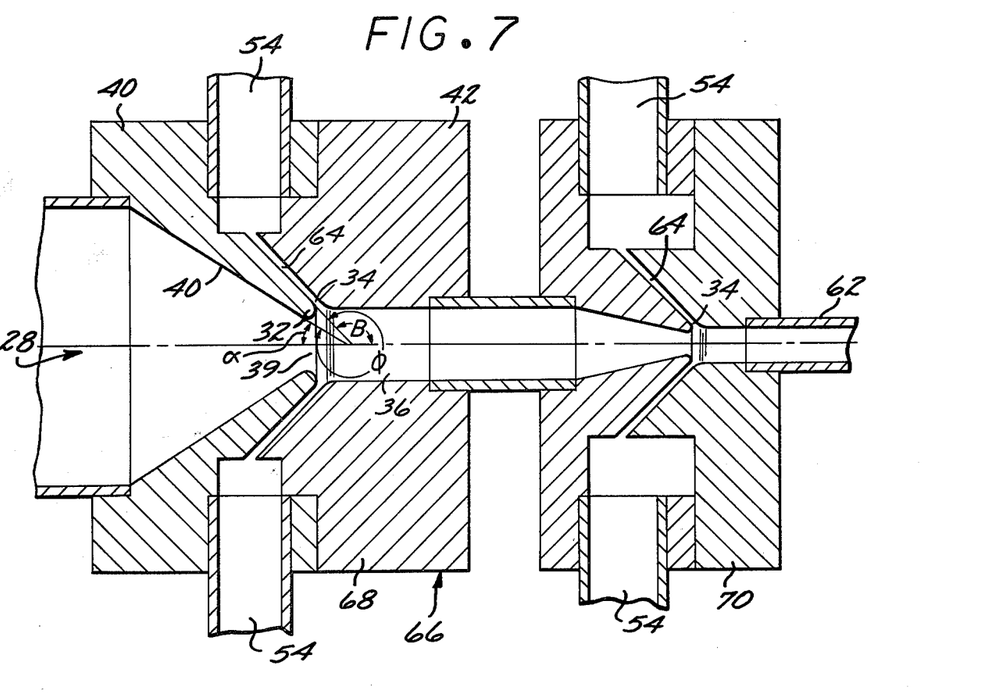
FIG. 7 is a cross-sectional view showing a second actual preferred embodiment of the particulate separator of the present invention wherein two collector elements are coupled to one another.
Figure 8:
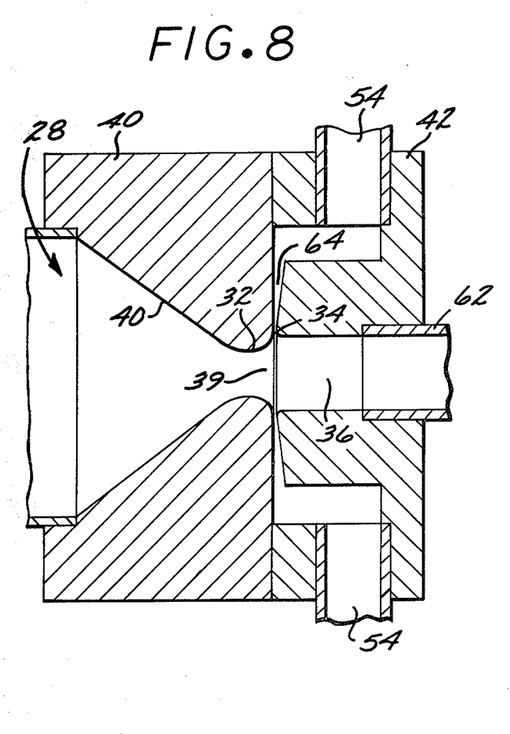
FIG. 8 is a cross-sectional view showing a third actual preferred embodiment of the particulate separator of the present invention.

Referring now to FIG. 7 a specific example of a two-stage particulate separator 66, built in accordance with the present invention, is shown. The two-stage particulate separator 66 includes a first separator unit or element 68 which is built in accordance with the design parameters indicated in Table I for design D. A second separator unit or element 70 is coupled downstream to the first element 68 so that the outcoming bleed flow, or "dirty" gas flow of the first element 68 comprises the input of the second element 70. The second element or unit 70 is built in accordance with the design parameters indicated in Table I for design C.

Clean gas collected by both the first and second elements 68 and 70 is substantially free of particulate matter. The bleed flow or "dirty" gas collected in the discharge duct 36 of the second element 70 includes substantially all of the particulate matter of the carrier gas which entered the first element 68.

Generally speaking, in an industrial-scale separator designed for the clean-up of industrial quantitities of gases, an array of several hundred to several thousand, or more, of the hereinbefore-described individual single-stage or two-stage separator units is utilized. The individual separator units are in parallel disposition relative to one another in the array. Various embodiments of the two-stage unit may be included in the array, and three or more stage units are also possible. In one specific example of a two-stage separator unit, built in accordance with the present invention but not specifically shown in the drawing Figures, the bleed flow, or "dirty" gas output of three parallel "C" units is combined and directed into another "C" unit which serves as the second stage. In yet another example of a two stage separator unit, the bleed flow of an F unit is directed into another F unit which serves as a second stage. The industrial gas which the array of separator units is designed to rid of particulate matter may comprise combustion gases of coal or other fuel burning power plants, or gaseous products of various chemical processes.

Figure 15:
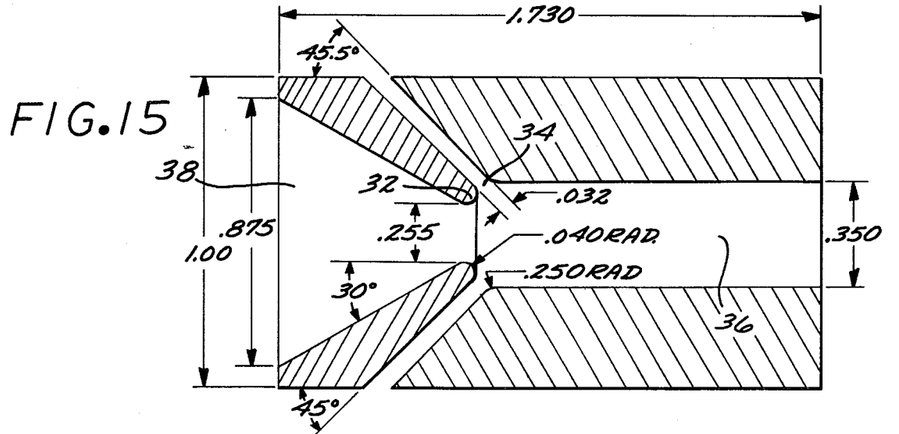
FIG. 15 is a partial cross-sectional view of a fifth actual preferred embodiment of the particulate separator of the present invention, the view also showing numerical values of several important dimensions of the separator.

FIG. 15 indicates, in a partial cross-sectional view, another actual preferred embodiment of the particle separator of the present invention. This embodiment is indicated on Table I as model "F", and the drawing figure also shows numerical values of several important dimensions of the embodiment.

FIGS. 16-20 show a combination of four model "F" separator units mounted in an enveloping pipe 72. The combination of the four model "F" separator units may, itself, comprise an element of an industrial-scale array of separator units.

As is apparent from FIGS. 16–20, three model "F" units 74 are mounted parallel to one another in the combination so that clean gas is discharged from each of the units 74 and leaves the combination through clean gas collecting tubes 76. The "dirty gas" flow or bleed flow of each of the three units 76 is combined and led into a fourth model "F" unit 78, which is located downstream of the first three, parallel disposed units 74. Clean gas of the fourth unit 78 is led into another clean gas collecting tube 80, and the "bleed flow" of the fourth unit 78 contains all the particulate matter which is separated from the gas flow.

The clean gas eminating from all the four units may be combined and used as such, or released to the environment, as applicable. Alternatively, the combined clean gases of the four units, or better stated, of the combination 4-unit two-stage separator element, may be subjected to further purification.

In the two- or multi-stage units the flow velocity of the carrier gas is preferably, but not necessarily, kept approximately the same in the inlet throat of all serially connected units. Since the bleed flow of a first unit is significantly less than the input flow of the first unit, the second unit preferably has a correspondingly smaller throat diameter than the first unit. This is shown in FIG. 7.

Figure 10:
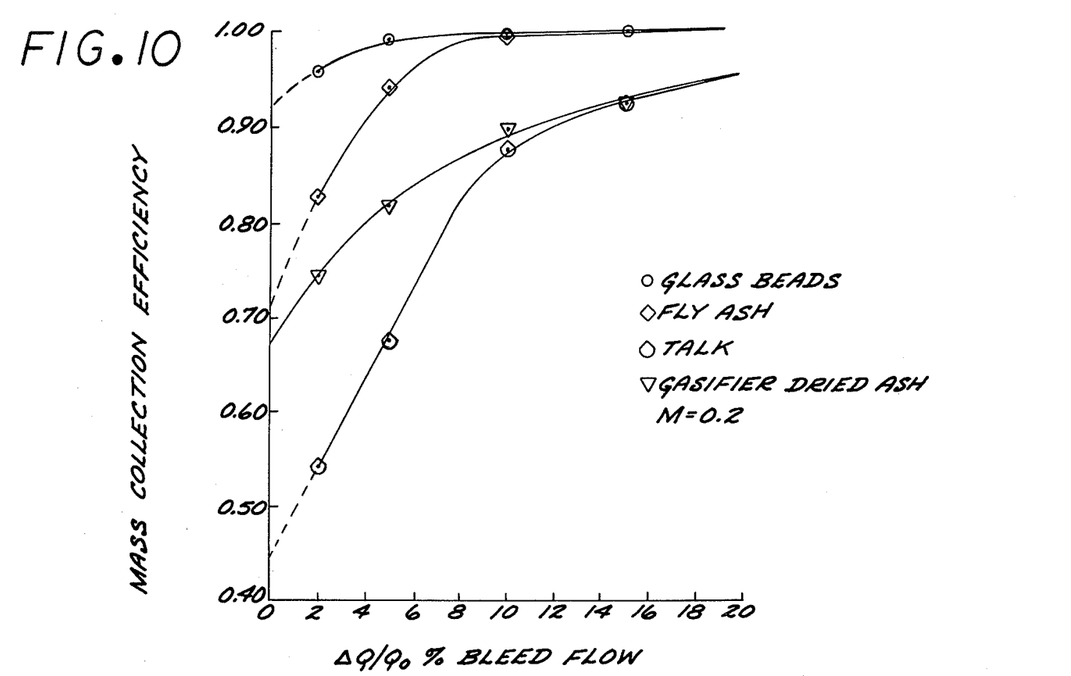
FIG. 10 is a graph showing the mass collection efficiency of a specific embodiment of a single-stage particulate separator of the present invention as a function of bleed flow and with regard to several types of particulate matter.
Figure 11:
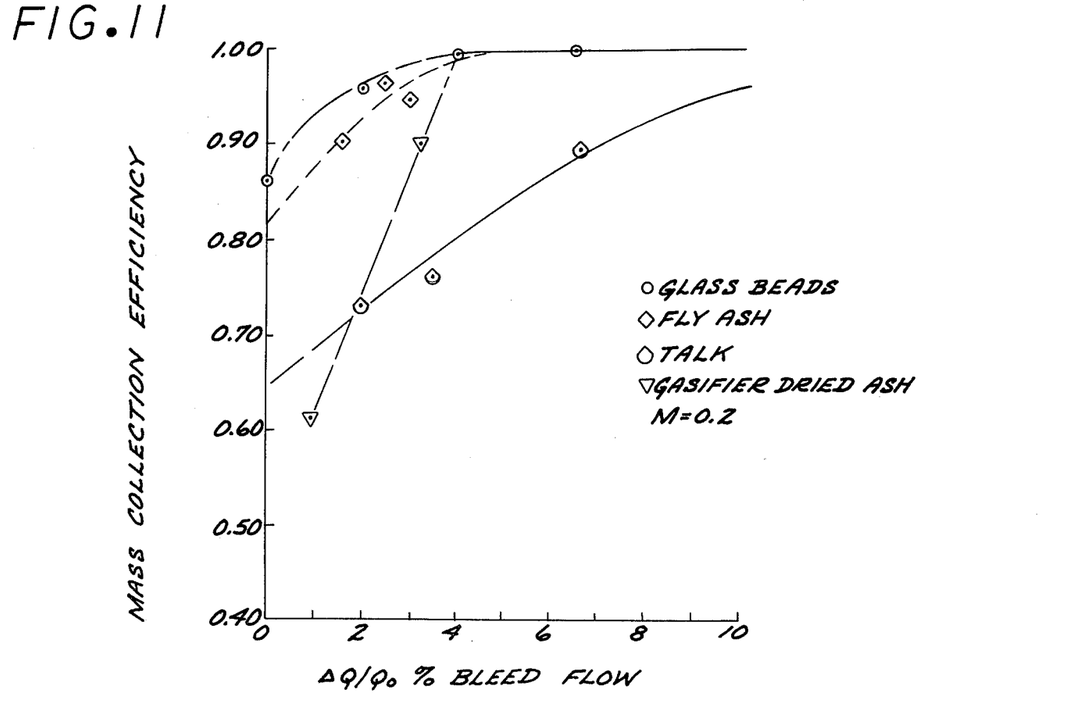
FIG. 11 is another graph showing the mass collection efficiency of a specific two-stage embodiment of the particulate separator of the present invention as a function of bleed flow, and with regard to several types of particulate matter.

Referring now to FIGS. 10, and 11, the effect of the bleed flow, as expressed in percentage of the total flow, on the overall mass collection efficiency of the separator of the present invention is shown with regard to solid particulate matter of various types. FIG. 10 shows data collected when a model "F" one-stage separator unit (as indicated in Table I) was used to collect glass beads, fly ash, talc powder and dried gasifier ash, respectively, from an air flow at M 0.20.

FIG. 11 shows data collected when a two-stage separator unit comprising two serially coupled model "F" separator units was used to collect glass beads, fly ash, talc powder and dried gasifier ash, respectively, from an air flow at M 0.20.

As is apparent from the graphs of FIGS. 10 and 11, the particle mass collection efficiency is best when substantially spherical particles, such as glass beads, are collected. Furthermore, the particle mass collection efficiency increases as the bleed flow increases. Increased bleed flow, however, results in a decrease in the amount of the "clean" gas which is collected by the separator.

With regards to two-, or multi-stage particle separators built in accordance with the present invention, it is noted that it is advantageous for these units to have a relatively large bleed flow in the individual stages. This is because the overall mass collection efficiency ($\eta$) of a multi-stage or i-stage serially coupled separator system built in accordance with the present invention is substantially a product of the mass collection efficiencies of the individual stages pursuant to Equation VI. The overall bleed flow ($\epsilon$) of a multi-stage, or $$\eta = \eta_1 \cdot \eta_2 \cdot \eta_3 \cdots \eta_i \qquad \text{EQUATION VI}$$

i-stage, serially coupled separator system built in accordance with the present invention is substantially a product of the bleed-flows of the individual stages, pursuant to Equation VII.

$$\epsilon = \epsilon_1 \cdot \epsilon_2 \cdot \epsilon_3 \cdots \epsilon_i \qquad \text{EQUATION VII}$$

Therefore, overall high collection efficiency is achieved when relatively large bleed-flows are designed in the individual units, with resulting high individual collection efficiencies, while the overall bleed flow still remains desirably small. For example, when the bleed flows of the two-stage unit shown in FIG. 7 were adjusted to be 30% for the frontal "D" unit component, and 10% for the "C" unit component, the overall observed collection efficiency for glass beads at M 0.20 flow velocity was 99%, and the overall bleedflow was a desirably low 3%.

An additional advantage of the hereinabove described construction of the individual separator units, and of the two- or multi-stage systems utilizing the individual units, is the following. As it will be well appreciated by those familiar with fluid flow mechanics, the pressure drop in each unit is principally due to friction. In other words, the outer boundary layer of the gas flow is slowed down by friction with the walls of the duct 28. Since in accordance with the novel construction of the separator units of the present invention, the boundary layer is removed through the radial opening from each unit, any pressure drop in a succeeding stage is substantially not cumulative to the pressure drop in a preceeding stage. Consequently, a multi-stage separator still causes only a low overall pressure drop to the gas flow, and therefore even a multi-stage separator built in accordance with the present invention is quite energy efficient.

Figure 16:
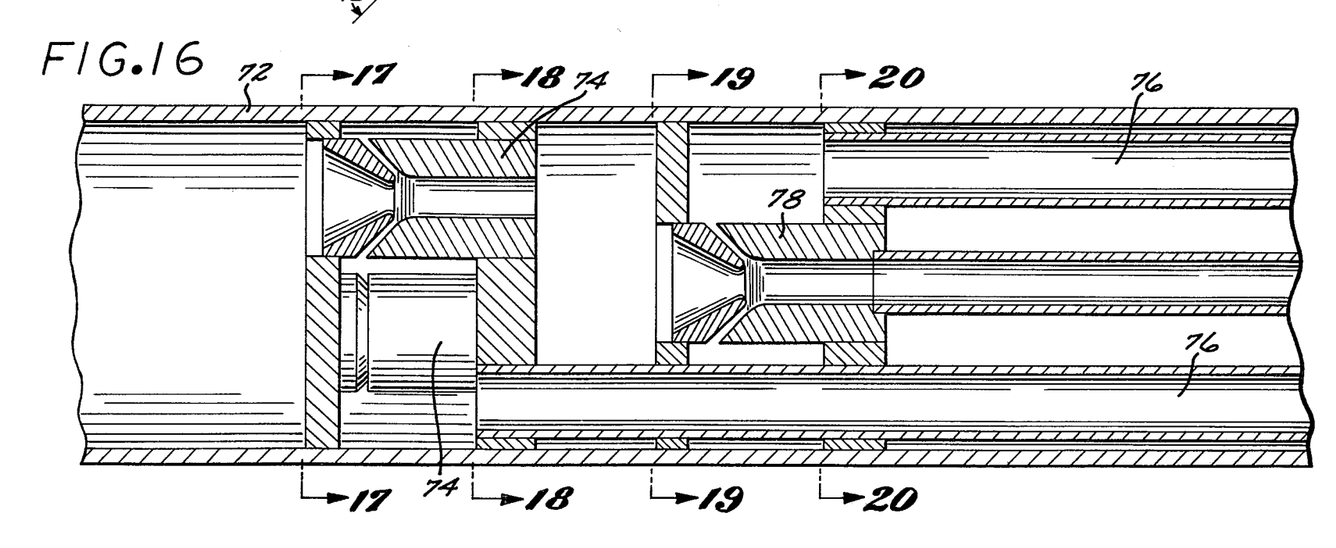
FIG. 16 is a partial cross-sectional view of a four-unit separator combination comprising three parallel and one linearly coupled separator unit of the type shown on FIG. 15.
Figure 17:
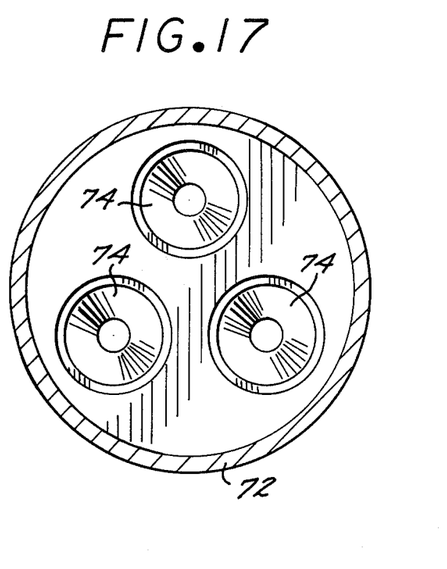
FIG. 17 is a cross-sectional view taken on lines 17—17 of FIG. 16.
Figure 18:
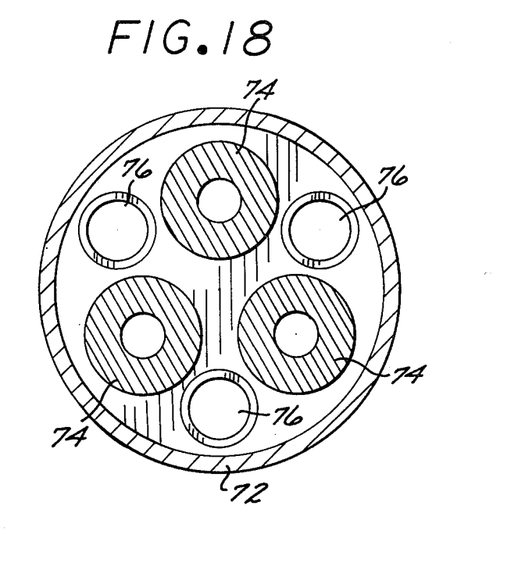
FIG. 18 is a cross-sectional view taken on lines 18—18 of FIG. 16.
Figure 19:
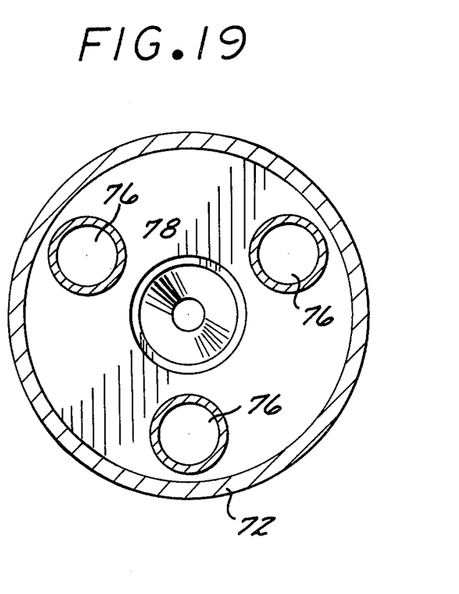
FIG. 19 is a cross-sectional view taken on lines 19—19 of FIG. 16.
Figure 20:
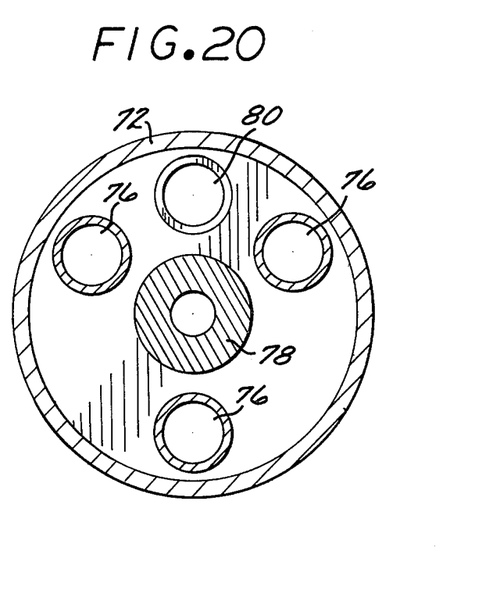
FIG. 20 is a cross-sectional view taken on lines 20—20 of FIG. 16.
Figure 21:
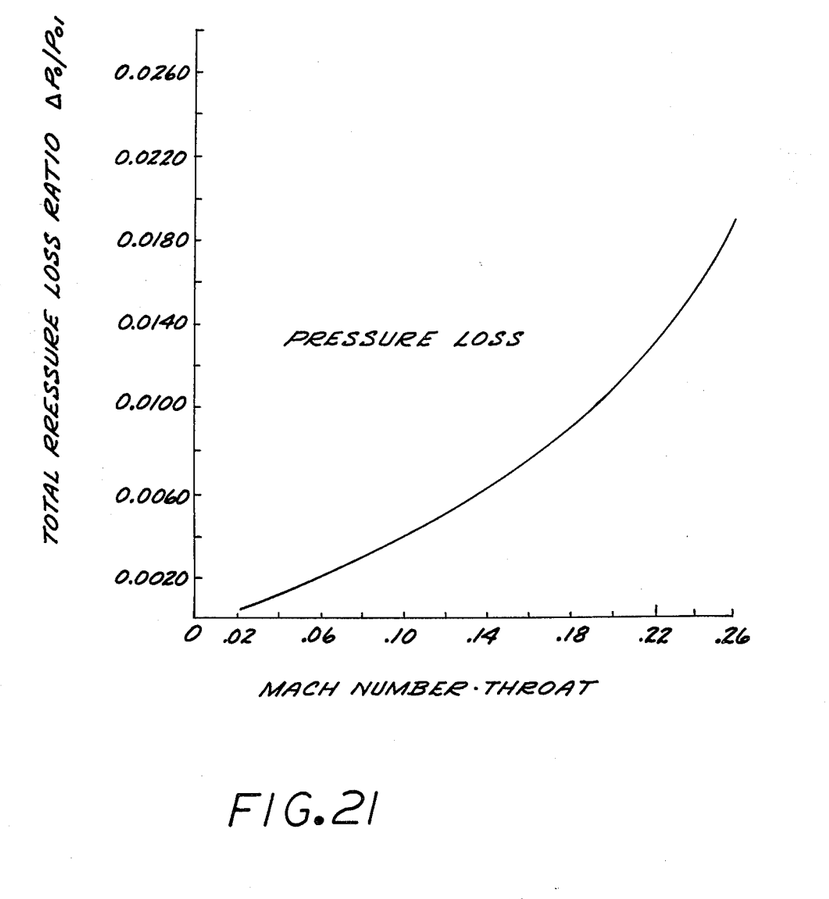
FIG. 21 is a graph showing the relative pressure loss versus throat flow velocity relationship in the four-unit separator combination shown on FIG. 16.

FIG. 21 shows relative pressure loss in the 4-unit two-stage separator element shown in FIG. 16, as a function of flow velocity in the throat of the first stage units. As it is apparent from the graph, the pressure loss is small, approximately 1% of M=0.2 velocity.

Figure 12:
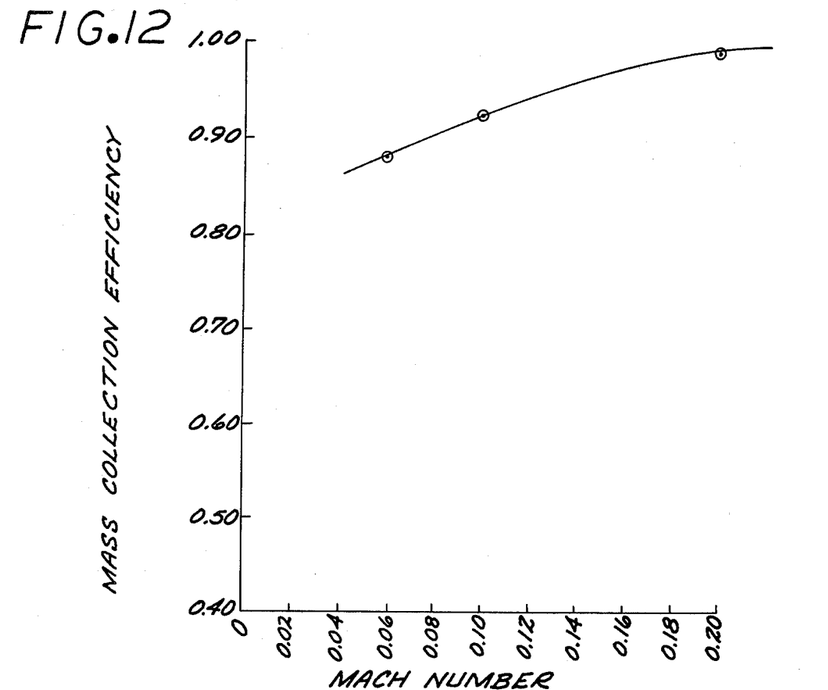
FIG. 12 is still another graph showing the mass collection efficiency of a specific embodiment of the particulate separator of the present invention as a function of gas flow velocity.

Referring now to the graph of FIG. 12, the mass collection efficiency of the particle separator of the present invention is shown as a function of gas flow velocity. The data represented by the graph were collected using a "C" type particle separator (as indicated in Table I), collecting glass beads with an approximately 5% bleed flow. As can be seen from the graph, in the 0.04–0.20 M range, the collection efficiency increases with increasing flow velocity. In fact, gas flow velocities in the throat of the separator of approximately 0.04 to 0.2M are most preferred in the separators of the present invention.

Figure 13:
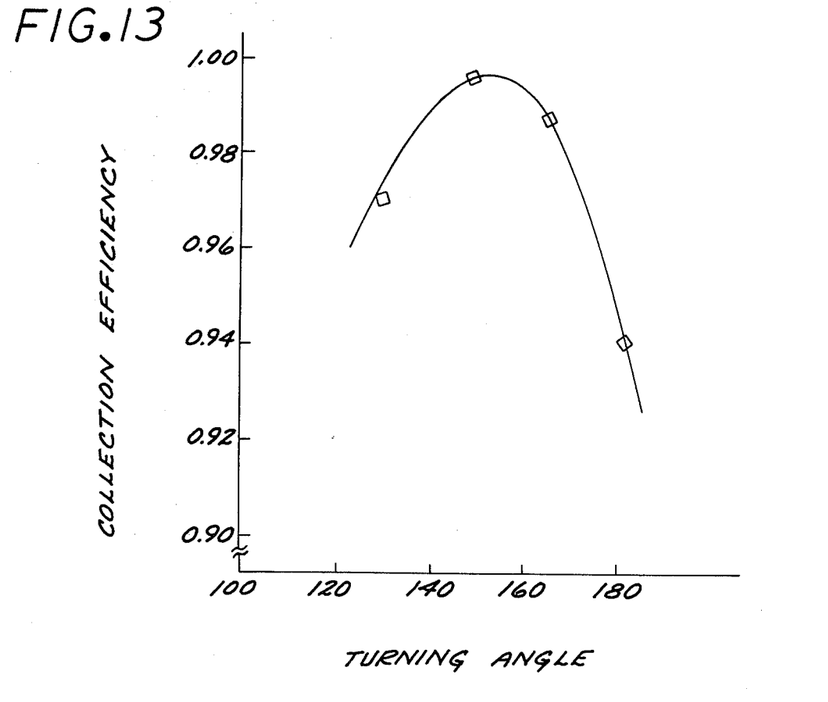
FIG. 13 is a graph showing the mass collection efficiency of the particulate separator of the present invention as a function of the turning angle of the gas flow in the separator.

Referring now to the graph of FIG. 13, the mass collection efficiency of the particulate separator of the present invention is disclosed as a function of the turning angle ($\theta$) of the gas flow in the separator. As the graph indicates, it was found in experience that good collection efficiency is obtainable when the turning angle is approximately between 120° and 180°. Preferred turning angles are approximately in the 135° to 165° range, but even turning angles in the 40°–180° range give acceptable results.

Figure 14:
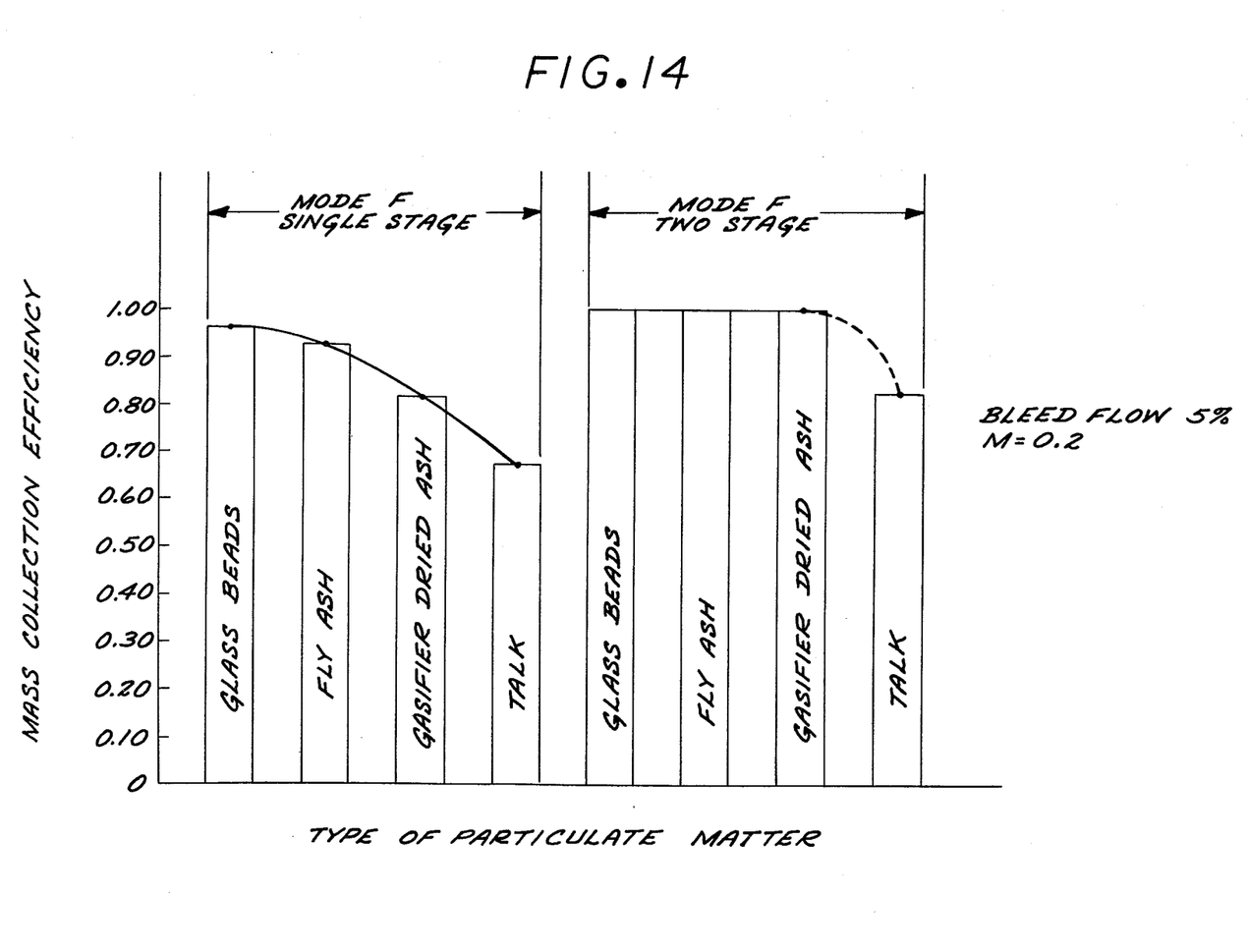
FIG. 14 is a graph showing the mass collection efficiency of a specific one-stage, and two-stage embodiment of the particulate separator of the present invention as a function of the nature of the solid particles carried in the gas flow.

The graph of FIG. 14 shows the mass collection efficiency of a single-stage model "F" separator unit, and a two-stage separator unit built by serial coupling of two model "F" separator units, as a function of the nature of the particles which are separated from air acting as a carrying gas. During the experiments by which the data shown in FIG. 14 were collected, the flow velocity was approximately 0.20M, and the overall bleed flow was approximately 5%. As is apparent in the graph, substantially spherical particles, such as glass beads are collected most efficiently by the separator units. Particles of irregular shape, and especially talc powder, are collected somewhat less efficiently. However, the two-stage separator is still capable of collecting fly ash, and dried gasifier ash with very good efficency.

In practical applications for the clean-up of stack-gases, and gases of certain industrial chemical processes, the particulate matter carried in the carrying gas may have a tendency to form lumps, and stick to the walls of the separator unit. This is clearly undesirable, since the lumps of the collected particles, and particles deposited on the walls may eventually clog and disable the separator unit. The collected, sticking particles may however be removed from the separator unit, and the unit may be maintained in an operating state by periodic injection of steam or other gases through a steam inlet port 82 as is shown schematically on FIG. 5.

The steam inlet port 82 is located downstream of the radial opening 34 and is also advantageously of an axisymmetrical configuration relative to the longitudinal axis 30 of the duct 28.

The axisymmetrical separator of the present invention is preferably fabricated from ceramic materials, such as silicone carbide, silicon nitride, tungsten carbide, etc., by hot pressing, sintering or like processes. Due to their axisymmetrical shape, both the first and second solid bodies 40 and 42 are very well adapted for mass-production and fabrication by the above-noted processes. Furthermore, ceramic materials, and particularly silicon-nitride are, generally speaking, well adapted to withstand the corrosive chemical environment and high temperatures at which the axisymmetrical separator of the present invention is routinely operated.

Several modifications of the axisymmetrical particle separator of the present invention may become readily apparent to those skilled in the art in light of the above disclosure. Therefore, the scope of the present invention should be interpreted solely from the following claims.

What is claimed is:

1. A separator adapted for separating particulate matter carried in a carrier gas, from the carrier gas, the separator comprising:
a solid body incorporating an opening leading into a duct having a substantially straight longitudinal axis, adjacent to the opening the duct having walls defining a nozzle axisymmetrically arranged relative to the longitudinal axis of the duct, the nozzle walls positioned at an angle $\alpha$ relative to the longitudinal axis for accelerating the carrier gas toward the longitudinal axis, the duct having adjacent to and downstream from the nozzle a curved portion, the walls of said curved portion being comprised by the body and being axisymmetrical relative to the longitudinal axis of the duct and having an effective radius of curvature R, an opening being disposed in the duct adjacent to the curved portion, the opening leading into a channel formed in the body, a minimum diameter of the duct between the nozzle and the opening adjacent to the curved portion being $D^*$, the opening and the channel being axisymmetrical relative to the longitudinal axis of the duct, the channel forming an angle $\beta$ with said longitudinal axis as measured from the downstream side of the axis for receiving the substantial majority of the gas, an outlet portion of the duct being adjacent to said opening, the walls of said outlet portion being formed by the body and being axisymmetrical relative to the longitudinal axis of the duct, said outlet portion having a diameter $D_2$, and terminating in a second opening in the body, the angle $\beta$ being at least 90° and the sum of the angles $\alpha$ and $\beta$ consisting of angle $\theta$ wherein $\theta$ is approximately between 120° to 180°, R is approximately between 0.04 to 0.20 inches, and $D_2/D^*$ is approximately between 1.085 to 1.52, whereby the gas and particulate matter are subjected to a centrifugal force by the walls of the curved portion and the channel which carries the majority of the particulate matter to flow along the longitudinal axis and into the outlet portion together with an appropriate amount of carrier gas.

2. The separator of claim 1 wherein $D^*$ is approximately between 0.15 to 0.75 inches, and $D_2$ is approximately between 0.30 to 1.025 inches.

3. The separator of claim 1 wherein the body is a ceramic body.

4. The separator of claim 1 wherein the opening in the duct adjacent to the curved portion has a width of between 0.02 to 0.65 inches.

5. The separator of claim 1 wherein the angle $\theta$ is approximately 135°.

6. The separator of claim 1 wherein the nozzle is constructed and arranged to accelerate the flow of carrier gas to a maximum velocity in the diameter $D^*$ of the duct within the range of 0.04 to 0.2 Mach.

7. The separator of claim 1 wherein the body incorporates at least one collection slot, said collection slot being in communication with the channel and being adapted for collecting carrier gas substantially free of particulate matter larger than approximately 2 microns.

8. A system for separating particulate matter carried in a fluid-carrying medium, from the carrying medium, the system comprising an array of first collection elements, said elements being mounted parallel with one another for passing the carrying medium through the elements, each element comprising:
a solid body incorporating a first opening leading into a duct formed in the body, said first opening comprising an inlet to the duct, the body incorporating a second opening leading into the duct, the second opening comprising an outlet for the duct, the body incorporating a channel connected to the duct around the periphery thereof and having an outlet from the body, internal walls of body forming the duct and the channel, the duct having a substantially straight longitudinal axis, an inlet nozzle portion adjacent and downstream from the first opening, and a curved wall portion adjacent to the downstream of the inlet portion, the curved wall portion having a curved cross-section taken in the direction of the general longitudinal axis of the duct and joining the walls of the inlet nozzle portion with the adjacent walls of the channel to prevent turbulence of the medium and separation of the boundary layer as the medium flows through the inlet nozzle and into the channel, the channel being arranged so that medium entering the channel from a path parallel to the longitudinal axis will have a turning angle of greater than 90° an outlet portion of the duct being disposed adjacent to and downstream of the channel, the outlet portion leading to the second opening, the inlet portion, the curved wall portion, the channel and the outlet portion all being axisymmetrical relative to the general longitudinal axis of the duct, whereby a substantial majority of the particulate matter carried in the fluid-carrying medium is forced to travel through the duct including the outlet portion of the duct and whereby a majority of the fluid-carrying medium exits from the duct through the channel in a state substantially free of particulate matter.

9. The system of claim 8 wherein the inlet nozzle portion of the duct of each element has substantially conically-shaped inner walls narrowing towards the curved wall portion whereby the flow of the fluid-carrying medium and the particulate are accelerated as the fluid-carrying medium passes through the inlet nozzle portion.

10. The system of claim 8 wherein the channel is approximately at a 135° angle relative to the longitudinal axis of the duct as measured from the downstream side of the axis.

11. The system of claim 8 wherein each collection element is adapted for separating particulate matter from a gaseous carrying medium, wherein the walls of the inlet nozzle portion of the duct have an angle $\alpha$ relative to the longitudinal axis of the duct, wherein the curved cross-section of the curved wall portion of the duct has an effective radius R, wherein the diameter of the duct in the curved wall portion is $D^*$, wherein the channel has an angle $\beta$ relative to the longitudinal axis of the duct as measured from the downstream side of the axis, wherein the diameter of the outlet portion is $D_2$, wherein R is approximately between 0.04 to 0.20 inches, the sum of angles $\alpha$ and $\beta$ is approximately between 130° to 165°, and the ratio of $D_2$ to $D^*$ is approximately between 1.085 to 1.52.

12. The system of claim 11 wherein $D^*$ is approximately between 0.15 to 0.75 inches, and $D_2$ is approximately between 0.30 to 1.025 inches.

13. The system of claim 11 comprising a multitude of additional collection elements, each additional collection element being as defined in claim 11, and wherein the inlet nozzle portion of the duct of each additional collection element is coupled to the outlet portion of the duct of one of the first collection elements.

14. The system of claim 8 comprising a multitude of additional collection elements, each additional collection element being as defined in claim 8, and wherein the inlet nozzle portion of the duct of each additional collection element is coupled to the outlet portion of the duct of one of the first collection elements.

15. The system of claim 13 or 14 wherein each additional collection element is dimensioned so that a flow velocity of the carrier gas in the curved wall portion of the duct of the additional collection element is substantially equal to the flow velocity of the carrier gas in the curved wall portion of the duct of the first collection element to which the additional collection element is coupled.

16. The system of claim 8 wherein the solid body incorporates at least one additional channel in fluid communication with the duct, the additional channel comprising injection means for injecting a purging medium into the duct for removing particulate matter adhered to the walls of the duct.

17. A system adapted for separating particulate matter carried in a carrier gas, from the carrier gas, the system comprising an array of separating elements mounted parallel relative to one another in the flow of the carrier gas, each element comprising:

a solid body and axisymmetrical duct means incorporated in the solid body for accelerating the flow of the carrier gas toward the longitudinal axis to a maximum velocity within the range of approximately 0.04 to 0.02 Mach;

axisymmetrical curved walls means adjacent to the duct means and downstream therefrom;

axisymmetrical outlet means disposed in the solid body adjacent to the curved wall means and downstream therefrom for directing a majority of the carrier gas through a turning angle within approximately the range of 130° to 165°, whereby the curved wall means and the outlet means subject the carrier gas and the particulate matter to a centrifugal force which causes a majority of the particulate matter to flow in a substantially cylindrical path without rotation along the longitudinal axis of the duct means and the carrier gas in a state substantially free of particulate matter to escape from the duct means by flowing outwardly relative to the longitudinal axis of the duct means and into the outlet means; and axisymmetrical discharge means disposed in the solid body adjacent to the outlet means and downstream therefrom for discharging the majority of a particulate matter and a minor portion of the carrier gas from the solid body, the duct means, curved wall means, outlet means and discharge means all being axisymmetrical relative to the longitudinal axis.

18. The system of claim 17 wherein the duct means, curved wall means, outlet means and discharge means are formed by the internal walls of the solid body.

19. The system of claim 18 wherein the duct means comprise a substantially conically-shaped nozzle narrowing towards the curved wall means.

20. The system of claim 18 wherein the outlet means comprise an opening adjacent to the curved wall means and a channel in the solid body.

21. The system of claim 20 wherein the discharge means comprise a discharge duct.

22. In a separator for separating particulate matter from a fluid-carrying medium the combination comprising:

a duct having a longitudinal axis and the following components arranged serially and axisymmetrically with respect to the longitudinal axis, an inlet nozzle for accelerating the medium toward the longitudinal axis, a curved wall section, an annular opening in the periphery of the duct and a particulate outlet portion; and means defining an outlet channel for the fluid-carrying medium connected to the annular opening, the outlet channel being disposed at an angle $\beta$ with respect to the longitudinal axis as measured from the downstream side of the axis, the angle $\beta$ being equal to or greater than 90°, the curved wall section forming a smooth transition between the wall of the inlet nozzle and the adjacent outlet channel wall to prevent turbulence of the fluid-carrying medium and separation of the boundary layer as the medium flows from the inlet nozzle into the outlet channel;

the inlet nozzle, being constructed and arranged to accelerate the flow of the fluid-carrying medium to a maximum velocity within the duct of between 0.04 and 1.0 Mach, whereby the fluid-carrying medium and the particulate matter carried therein is subjected to a centrifugal force as the medium is directed through the nozzle along the curved wall section and into the outlet channel to cause a substantial majority of the particulate matter to follow the longitudinal axis into the outlet portion of the duct while a substantial majority of the fluid-carrying medium is directed through the outlet channel.

23. The separator of claim 22 wherein the inlet nozzle has substantially conically-shaped walls which are positioned at an angle $\alpha$ relative to the longitudinal axis as measured from the upstream side of the longitudinal axis, the sum of the angles $\alpha$ and $\beta$ being within the range of about 130° to 165°.

24. The separator of claim 23 wherein the curved wall section has an effective radius of curvature R, where R is within the range of about 0.04 to 0.20 inches.

25. The separator of claim 24 wherein the smallest diameter of the nozzle and curved wall section is $D^*$, the diameter of the outlet portion is $D_2$ and the ratio of $D^*$ to $D_2$ is approximately between 1.085 to 1.52.

26. The separator of claim 25 wherein $D^*$ is approximately between 0.15 to 0.75 inches, and $D_2$ is approximately between 0.30 to 1.025 inches.

27. The separator of claim 22 where the nozzle is constructed and arranged to accelerate the flow of the fluid-carrying medium to a maximum flow velocity within the duct of between 0.04 and 0.2 Mach.

28. The separator of claim 27 wherein the annular opening for receiving the substantial majority of the fluid-carrying medium has a width of approximately 0.03 to 0.165 inches.

29. The separator of claim 27 wherein the duct and the outlet channel are arranged to direct approximately 95% of the fluid-carrying medium into the outlet channel.

* * * * *